United States Patent
Tanz et al.

(10) Patent No.: US 9,475,097 B2
(45) Date of Patent: Oct. 25, 2016

(54) SORTING APPARATUS FOR SORTING PIECE GOODS

(71) Applicant: SIEMENS AKTIENGESELLSCHAFT, München (DE)

(72) Inventors: Torsten Tanz, Hilzingen (DE); Michele Vitalini, Nürnberg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 106 days.

(21) Appl. No.: 14/346,588

(22) PCT Filed: Sep. 24, 2012

(86) PCT No.: PCT/EP2012/068727
§ 371 (c)(1),
(2) Date: Mar. 21, 2014

(87) PCT Pub. No.: WO2013/045375
PCT Pub. Date: Apr. 4, 2013

(65) Prior Publication Data
US 2014/0231220 A1   Aug. 21, 2014

(30) Foreign Application Priority Data

Sep. 30, 2011 (DE) .................. 10 2011 083 882

(51) Int. Cl.
*B65G 17/34* (2006.01)
*B65G 37/00* (2006.01)
(Continued)

(52) U.S. Cl.
CPC ............ *B07C 5/36* (2013.01); *A22C 21/0053* (2013.01); *B61B 10/027* (2013.01); *B65G 37/00* (2013.01)

(58) Field of Classification Search
CPC ...... B65G 37/00; B65G 17/345; B07C 5/36; B07C 3/08; B07C 3/082; B61B 10/27
USPC ...... 198/370.06; 104/48, 288, 289; 105/239, 105/241.1, 311.1, 311.2
See application file for complete search history.

(56) References Cited

U.S. PATENT DOCUMENTS 4,781,281 A * 11/1988 Canziani .............. B65G 17/345
198/370.06
4,884,676 A * 12/1989 Suizu ................... B65G 17/345
198/370.06
(Continued)

FOREIGN PATENT DOCUMENTS

DE   10 2007 040 859       3/2009
WO   WO 01/10574 A1         2/2001

OTHER PUBLICATIONS

Patent Examination Report No. 1 dated Nov. 20, 2014 in corresponding Australian Patent Application No. 2012314595 (2 pages).
(Continued)

*Primary Examiner* — Mark A Deuble
(74) *Attorney, Agent, or Firm* — Ostrolenk Faber LLP

(57) ABSTRACT

A sorting apparatus for sorting piece goods (12), having at least a first moving transport unit (22) for transporting at least one piece good (12) in a main transport direction (18), the first transport unit (22) has a chassis (38) for the movement, a transfer unit (32) which moves the piece good (12) in a transfer direction (50), and a drive unit (34) fixed to the first transport unit (22) for driving the piece good (12) in the transfer direction (50). The sorting apparatus has a coupling device (62) for coupling the chassis (38) to the drive unit (34) at least for a period of time.

6 Claims, 2 Drawing Sheets

(51) Int. Cl.
*B07C 5/36* (2006.01)
*B61B 10/02* (2006.01)
*A22C 21/00* (2006.01)

(56) References Cited

U.S. PATENT DOCUMENTS

| | | | | |
|---|---|---|---|---|
| 5,701,992 A * | 12/1997 | Enomoto | ............. | B65G 17/345 198/370.06 |
| 6,478,138 B1 * | 11/2002 | Edwards | ............. | B65G 17/345 198/370.06 |
| 6,762,382 B1 | 7/2004 | Danelski | | |
| 6,762,682 B2 | 7/2004 | Okamoto et al. | | |
| 7,080,725 B2 * | 7/2006 | Hishinuma | .......... | B65G 17/345 198/370.06 |
| 8,033,379 B2 | 10/2011 | Syndikus | | |
| 2006/0021540 A1 | 2/2006 | Austin | | |
| 2009/0057100 A1 | 3/2009 | Syndikus | | |
| 2012/0012442 A1 * | 1/2012 | Bacic | .................. | B65G 17/345 198/793 |
| 2014/0014468 A1 * | 1/2014 | Pilarz | .................... | B65G 47/53 198/370.03 |
| 2015/0360869 A1 * | 12/2015 | Bastian, II | .......... | B65G 17/345 198/349 |

OTHER PUBLICATIONS

International Search Report dated Jan. 25, 2013 issued in corresponding International Patent Application No. PCT/EP2012/068727.
Written Opinion dated Jan. 25, 2013 issued in corresponding International Patent Application No. PCT/EP2012/068727.
German Examination Report dated Apr. 18, 2012 issued in corresponding German patent application No. 10 2011 083 882.1.

* cited by examiner

SORTING APPARATUS FOR SORTING PIECE GOODS

CROSS-REFERENCE TO RELATED APPLICATIONS

The present application is a 35 U.S.C. §§371 national phase conversion of PCT/EP2012/068727, filed Sep. 24, 2012, which claims priority of German Patent Application No. 10 2011 083 882.1, filed Sep. 30, 2011, the contents of which are incorporated by reference herein. The PCT International Application was published in the German language.

TECHINCAL FIELD

The invention relates to a sorting apparatus for sorting individual items.

TECHNICAL BACKGROUND

A sorting apparatus has at least a first movable transport unit for transporting at least one individual item in a main transport direction. The first transport unit has a chassis for movement in the main transport direction. It has a transfer unit for moving the individual item in a transfer direction, which differs from the main transport direction, during a transfer operation. It also has a drive unit, which is fixed to the first transport unit and is provided for driving the individual item in the transfer direction.

Sorting apparatus are known, which convey a chain of coupled transport units along a conveyor section, in particular a closed circulating section, by means of a static, central drive. Linear drives, friction wheels or chain systems are conventional embodiments of such a central drive. Each transport unit also has a local drive unit, which can be used to drive a transfer unit, which has a belt element for example, for an inserting or ejecting operation.

The abovementioned central drives give rise to disadvantageous challenges in relation to the geometric and functional configuration of the sorting apparatus. In particular it is necessary to provide a large amount of space. Also such sorting apparatus are cost-intensive in respect of energy requirements.

The object of the invention is to provide a generic sorting apparatus, which allows a compact design and low operating costs to be achieved.

SUMMARY OF THE INVENTION

To achieve the object, it is proposed that the sorting apparatus has a coupling facility for coupling the chassis to the drive unit, at least for a period of time. This means there is no need, either at least largely, or in particular at all, for a central drive for driving the transport unit. There is thus no need for a considerable part of the space usually required for a central drive. Advantageously, direct driving of the chassis by the local drive unit allows energy losses, which result during the conventional transmission or conversion of the drive energy generated by a stationary unit for the onward movement of the transport unit in the main transport direction, to be avoided to the greatest possible degree.

The ability of the transport unit to move is defined relative to a stationary reference system, which is fixed to the base of a sorting unit. The movement of the transport unit also expediently takes place relative to at least one stationary input station and at least one stationary output station. During a transfer operation, which is configured as an input operation or an inserting operation, an individual item is transferred from the input station in a transfer direction to a passing transport unit, to be then transported in the main transport direction by means of the transport unit. An output or ejecting operation is a further transfer operation of the sorting apparatus, in which the individual item is transferred from the transport unit in a transfer direction to the output station, in order to be conveyed onward from there.

For movement of the transport unit in the main transport direction, the chassis expediently has at least guide elements, e.g. guide wheels, which correspond to corresponding stationary guide elements, e.g. guide rails, and carriage elements, which are actively connected particularly by a drive axle, to drive elements of the drive unit. The guide elements and carriage elements can be formed at least to some degree by identical parts.

The "coupling" of the chassis to the drive unit refers in particular to an operation, in which the drive unit and the chassis are coupled to one another for drive purposes. In this process the chassis is preferably connected to the drive train of the drive unit in such a manner that the resulting connection allows transmission of the drive energy generated by the drive unit to the chassis, with a torque of the chassis for example, as required for the onward movement of the transport unit, being generated by said drive energy.

The sorting apparatus is particularly suitable for an application as a component of a baggage handling unit, in particular in an airport, for sorting baggage items, and/or as a component of a package handling unit in a distribution center for sorting package units.

According to one advantageous embodiment of the invention the sorting apparatus has a control unit, which is provided to activate the coupling facility as a function of a transfer operation. This allows the time period for coupling the drive unit to the chassis to be matched in an efficient and precise manner to the performance of a transfer operation.

In this context it is proposed that the control unit is provided to establish coupling of the chassis to the drive unit on completion of a transfer operation, allowing particularly efficient utilization of the available drive power of the drive unit to be achieved. Based on the knowledge that the drive unit of a transport unit is conventionally deployed for transfer operations for approx. 20% of the operating time of the sorting apparatus, said drive unit can advantageously be deployed for up to 80% of the operating time for the onward movement of the transport unit in the main transport direction by means of the coupling of the drive unit to the chassis.

The control unit is advantageously a control unit fixed to the transport unit, in that it is coupled in a mechanically fixed manner to the transport unit. This allows short control paths to be achieved. The control unit is expediently connected in an active manner to a central, stationary monitoring unit for monitoring the flow of individual items by way of a data network.

In one advantageous development of the invention it is proposed that the sorting apparatus comprises at least a second transport unit for transporting at least one individual item in the main transport direction. The second transport unit is coupled mechanically to the first transport unit, and it has a transfer unit, which is provided to move the individual item it is transporting in a transfer direction, which differs from the main transport direction. During a transfer operation, the control unit assigned to the first transport unit causes the chassis of the first transport unit to be coupled to the drive unit of the first transport unit during a transfer operation of the second transport unit. This allows the drive unit of the first transport unit to be used for the onward movement of the second transport unit, which is coupled mechanically to it, in particular while the second transport unit performs a transfer operation.

In this context it is also proposed that the second transport unit has a chassis for movement in the main transport direction, a fixed drive unit, which is provided for driving the individual item it transports in the transfer direction, and a coupling facility, which couples the chassis of the second transport unit to its drive unit at least for a period of time. This allows an advantageous redundancy to be achieved in the drive of the transport units in the main transport direction in the sorting apparatus.

If the sorting apparatus has a set or chain of transport units coupled mechanically to one another, it is particularly advantageous if at least the majority of the transport units—in particular all the transport units—are provided with a chassis, a transfer unit, a drive unit and a coupling facility, as described above for the first transport unit.

BRIEF DESCRIPTION OF THE DRAWINGS

An exemplary embodiment of the invention is described in more detail with reference to the figures, in which.

DESCRIPTION OF EMBODIMENTS

Figure 1:
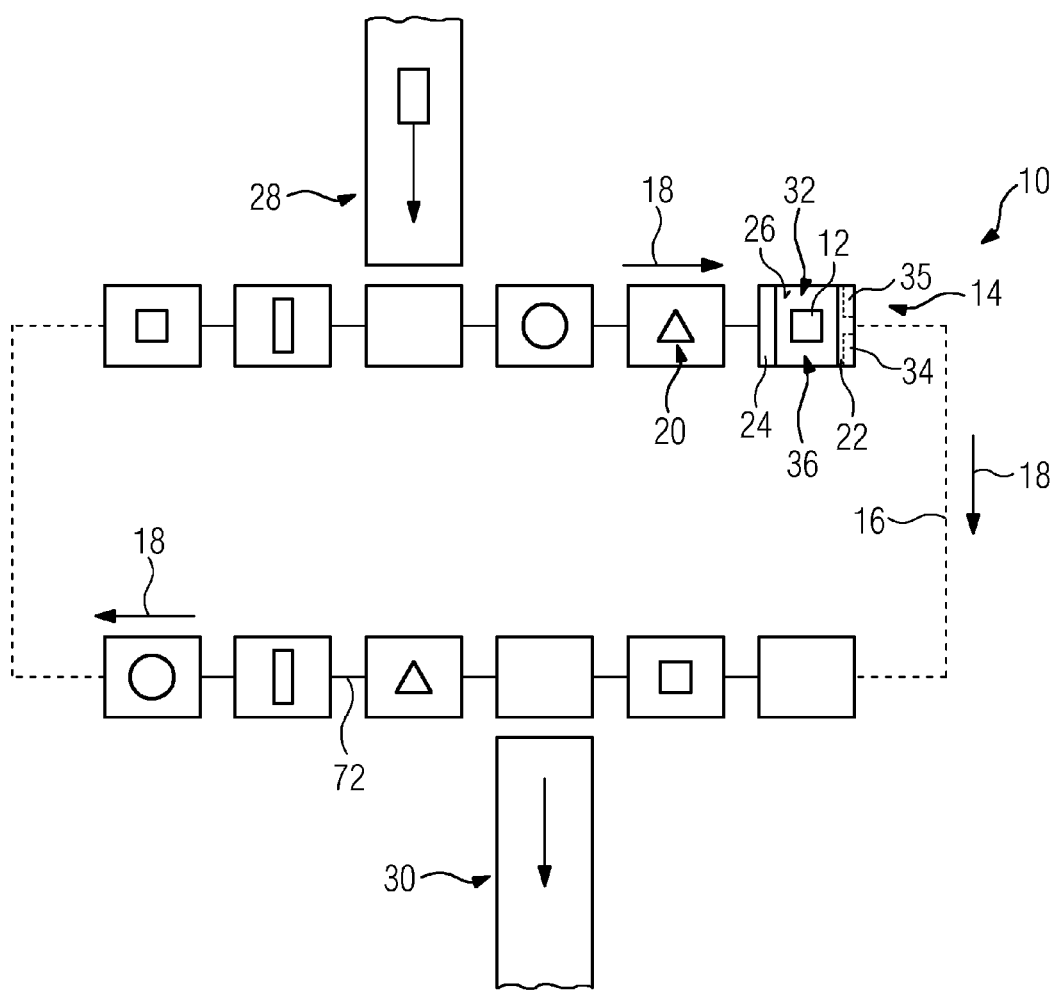
FIG. 1 shows a sorting apparatus with a set of transport units, which are conveyed along a circulating section

FIG. 1 shows a schematic view from above of a sorting apparatus 10 for sorting individual items 12. In the exemplary embodiment, the sorting apparatus 10 is configured as a component of a sorting and distribution center for sorting package units.

The sorting apparatus 10 has a conveyor unit 14, which in the present example is configured as a rotating conveyor. This conveyor unit 14 conveys individual items 12 to be sorted along a closed conveyor section 16. The direction in which the individual items 12 are moved by means of the conveyor unit 14 along the conveyor section 16 is referred to as the main transport direction 18, with the individual items 12 conveyed in the main transport direction 18 forming an individual item flow 20.

The conveyor unit 14 comprises a set of transport units 22, which are driven to move along the conveyor section 16. Each transport unit 22 is provided with a receiving facility 24, which receives at least one individual item 12 to be sorted. The receiving facility 24 in particular forms a transport surface 26, on which the individual item 12 remains as it is conveyed along the conveyor section 16.

The individual items 12 are sorted by means of transfer operations which take place at transfer stations 28, 30. At the transfer station 28 an individual item 12 is inserted into the individual item flow 20 in a transfer operation referred to as an inserting operation, in that it is conveyed to a transport unit 22 with free transport surface 26. At the transfer station 30 an individual item 12 conveyed by the conveyor unit 14 is removed from the individual item flow 20 in a transfer operation referred to as an ejecting operation, in that it is conveyed from the transport surface 26 to a technical conveyor unit of the transfer station 30.

The movement of the individual item 12 relative to the individual item flow 20 during an inserting and ejecting operation is brought about by means of a transfer unit 32, with which each transport unit 22 is provided. The transfer unit 32 has a drive unit 34, configured for example as an electric motor, and a conveyor facility 36, which can be driven by this and moves the individual item 12 to be transferred in a transfer direction 50, which differs from the conveyor direction 18 (see FIG. 2). Assigned to the conveyor facility 36 for the purpose of controlling the drive unit 34 is a control unit 35, which is for example a decentralized control unit in the form of a component of the transport unit 22. In an alternative embodiment the conveyor facility 36 can be controlled by a central, stationary control unit.

Figure 2:
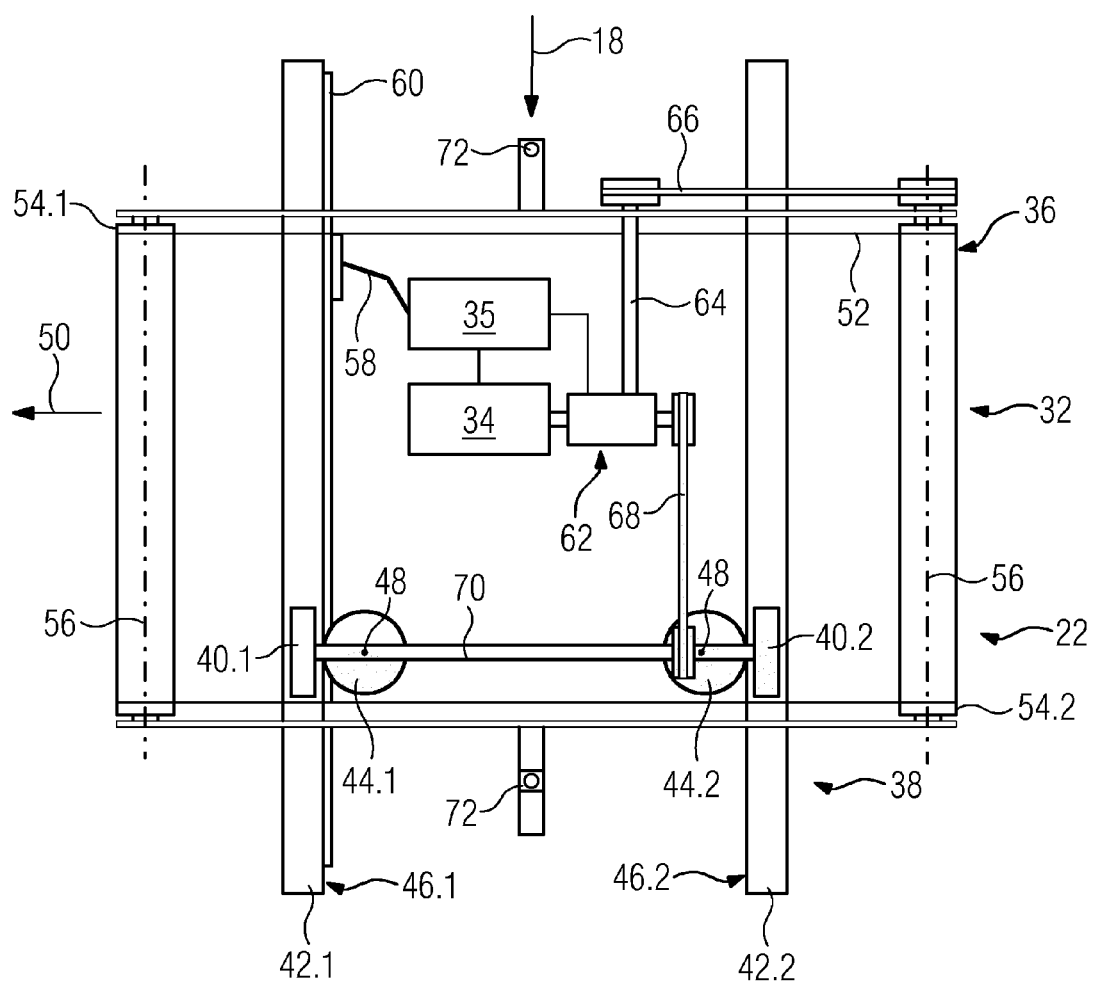
FIG. 2 shows a detailed view of one of the transport units from above.

One of the transport units 22 is shown more closely in a detailed view in FIG. 2. For movement in the main transport direction 18 the transport unit 22 is provided with a chassis 38. This has at least two drivable rolling bodies 40.1, 40.2, in particular in the form of drive wheels, which interact with corresponding stationary rails 42.1, 42.2 of the conveyor section 16. The chassis 38 also comprises a set of guide bodies 44.1, 44.2, which correspond to corresponding stationary guide elements 46.1, 46.2 of the conveyor section 16. These guide elements 46.1, 46.2 are in particular each formed here by a surface formed by one of the rails 42.1, 42.2. The rails 42.1, 42.2 therefore have the function of guide rails. The guide bodies 44.1, 44.2 are each configured as rolling bodies, which have a rotation axis 48 extending vertically and perpendicularly to the main transport direction 18.

As mentioned above, the transport unit 22 has a transfer unit 32, which is deployed in conjunction with a transfer station 28 or 30 for moving the individual item 12 in the transfer direction 50 during a transfer operation. In the example in question the transfer direction 50 is aligned perpendicularly to the main transport direction 18. For the purpose of conveying in the transfer direction 50 the transfer unit 32 is provided with the conveyor facility 36, which in the example in question has a conveyor element 52 configured as a conveyor line or conveyor belt. For the sake of clarity the conveyor element 52 is only shown with a broken line in the figure. To move the conveyor element 52 the conveyor facility 36 also comprises a pair of rollers 54.1, 54.2, which are aligned parallel to one another and each have a horizontal rotation axis 56 aligned in the main transport direction 18 or perpendicularly to the transfer direction 50. The roller 54.2 is configured as a drive roller, while the other roller 54.1 is a running roller.

As described above, the conveyor facility 36 has the drive unit 34 configured as an electric motor and the control unit 35, which is actively connected thereto. The drive unit 34 and the control unit 35 are therefore components of the movable transport unit 22, in other words they are coupled in a mechanically fixed manner, in particular rigidly, to a base body of the same. The drive unit 34 draws a drive energy required to drive it, in particular by way of the control unit 35, by means of a current collector 58, which engages with a stationary power rail 60 of the section 16.

The transport unit 22 is also provided with a coupling facility 62, which is connected downstream, in particular connected directly downstream, of the drive unit 34—in relation to the drive train. It is configured as an alternating coupling, which —in a first operating position—establishes a coupling between the drive unit 34 and the conveyor facility 36, in particular its drive roller 54.2 and—in a second operating position—establishes a coupling between the drive unit 34 and the chassis 38. The alternating coupling can in particular be configured as an electromechanical alternating coupling.

The first operating position of the coupling facility 62 is set by means of the control unit 35 during a transfer operation. The drive energy of the drive unit 34 is transmitted by way of further drive elements 64, 66 to at least one of the rollers 54, in particular to the drive roller 54.2. In the exemplary embodiment in question the drive elements 64, 66 are configured as a drive axle or drive belts. When the coupling facility 62 is in this operating position, the drive energy is used to drive the conveyor facility 36, by means of which the individual item 12 transported by the transport unit 22 is moved in the transfer direction 50.

On completion of the transfer operation the drive unit 34 is available for the onward movement of the transport unit 22. To this end the control unit 35 sets the coupling facility 62 in the second operating position, in which the drive unit 34 is coupled to the chassis 38 for drive purposes. This is brought about by means of a drive element 68, which is coupled to a drive axle 70 connecting the rolling bodies 40.1, 40.2. In the example in question the drive element 68 is configured as drive belts.

Further transport units 22—which form either part of the set of transport units 22 or advantageously the entire set of transport units 22 of the conveyor unit 14—are configured in an essentially identical manner to the transport unit 22 according to the above description. These transport units 22 each have at least a chassis, a transfer unit, a drive unit, a control unit and a coupling facility, by means of which the local drive unit can be coupled to the chassis, as described above.

All the drive units 34 of the conveyor unit 14 together form a drive, which has a high level of redundancy. Operation of the conveyor unit 14 can be continued with essentially the same power even if a drive unit 34 fails.

This is also true when a transfer operation takes place with one or more of the transport units 22. During the transfer operation of a transport unit 22 the corresponding drive unit 34 of said transport unit 22 is coupled for drive purposes to its conveyor facility 36, as described above, with the result that the drive energy of the drive unit 34 is not used for the onward movement of the transport unit 22. However this drive for onward movement is brought about by way of further transport units 22 coupled mechanically to said transport unit 22, the drive units 34 of which are each coupled to the local chassis 38. When a transfer operation is performed with a first transport unit 22, the control unit 35 of at least a second transport unit 22 coupled mechanically to the first transport unit 22 ensures that the coupling facility 62 of the second transport unit 22 couples the drive unit 34 to the chassis 38.

When its coupling facility 62 is in the second operating position, a drive unit 34 can therefore not only be used for the onward movement of its assigned transport unit 22 but it can also help with the onward movement of further transport units 22. This is the case in particular for the directly adjacent transport units 22, which are coupled to the illustrated transport unit 22 in FIG. 2 by means of mechanical couplings 72. With these couplings 72 the set of transport units 22 of the conveyor unit 14 forms a chain or train of transport units 22, which moves along the conveyor section 16.

The invention claimed is:

1. A sorting apparatus for sorting individual items, the sorting apparatus having:
    at least a first movable transport unit configured and operable for transporting at least one individual item in a main transport direction, the first transport unit having a chassis configured and operable for movement in the main transport direction;
    a transfer unit configured and operable for moving the individual item during a transfer operation in a transfer direction, which differs from the main transport direction;
    a drive unit fixed to the first transport unit and configured and operable to provide a first drive energy for driving the individual item in the transfer direction at least for a first period of time and to provide a second drive energy for driving the chassis in the main transport direction at least for a second period of time; and
    a coupling facility, configured and operable for coupling the chassis to the drive unit at least for a period of time.

2. The sorting apparatus as claimed in claim 1, further comprising a control unit configured and operable to activate the coupling facility as a function of a transfer operation.

3. The sorting apparatus as claimed in claim 2, further comprising at least a second transport unit configured and operable for transporting at least one individual item in the main transport direction, the second transport unit being coupled mechanically to the first transport unit;
    the second transport unit has a transfer unit, which is configured and operable to move the individual item it is transporting in the transfer direction, which differs from the main transport direction;
    during a transfer operation, the respective control unit assigned to the first transport unit is configured and operable to cause the chassis of the first transport unit to be coupled to the drive unit of the first transport unit during a transfer operation of the second transport unit.

4. The sorting apparatus as claimed in claim 3, further comprising:
    the second transport unit has a chassis for movement in the main transport direction, and a second fixed drive unit, which is configured and operable for driving the individual item it transports in the transfer direction at least for a third period of time and for driving the chassis in the main transport direction at least for a fourth period of time; and
    a coupling facility, which is configured and operable for coupling the chassis of the second transport unit to the second drive unit of the second transport unit at least for a period of time.

5. A sorting apparatus for sorting individual items, the sorting apparatus having:
    at least a first movable transport unit configured and operable for transporting at least one individual item in a main transport direction, the first transport unit having a chassis configured and operable for movement in the main transport direction;
    a transfer unit configured and operable for moving the individual item during a transfer operation in a transfer direction, which differs from the main transport direction;
    a drive unit fixed to the first transport unit and configured and operable for driving the individual item in the transfer direction;
    a coupling facility, configured and operable for coupling the chassis to the drive unit at least for a period of time; and
    a control unit configured and operable to activate the coupling facility as a function of a transfer operation,
    wherein the control unit is configured and operable to establish coupling of the chassis to the drive unit on completion of a transfer operation.

6. The sorting apparatus as claimed in claim 5, wherein the control unit is coupled in a mechanically fixed manner to the transport unit.

* * * * *